United States Patent
Van Nueten

[15] 3,657,645
[45] Apr. 18, 1972

[54] THICKNESS MEASURING DEVICE HAVING A SEGMENTED ROLLER AND HIGH GAIN AMPLIFIER

[72] Inventor: Emile Van Nueten, Herentals, Belgium
[73] Assignee: Gevaert-Agfa N.V., Mortsel, Belgium
[22] Filed: Apr. 11, 1969
[21] Appl. No.: 815,386

[30] Foreign Application Priority Data
Apr. 11, 1968 Great Britain......................17,621/68

[52] U.S. Cl. ..............................................324/65 R, 118/4
[51] Int. Cl. ..........................................................G01n 27/02
[58] Field of Search..................................324/61, 65; 118/4

[56] References Cited

UNITED STATES PATENTS 3,378,676   4/1968   Clement................................324/61 X

OTHER PUBLICATIONS

Netherlands Printed Patent Application 67 06577 July 25, 1967, DeGeest et al. (Shts. Dwg. 4 pp. Spec.– 21) 324– 365.

Primary Examiner—Edward E. Kubasiewicz
Attorney—William J. Daniel

[57] ABSTRACT

The thickness of an electroconductive coating on an electrically non-conductive web is measured in the transverse direction by an arrangement including a first roller connected to an AC tension and a second roller having a plurality of roller sections located in close side by side insulated relation transversely across the web, electric change-over contacts movable between an inoperative position connecting under the control of an appropriate controller, the roller sections in succession to the input of a high gain amplifier with resistive feedback, and a measuring device for measuring the output signal of the amplifier.

4 Claims, 7 Drawing Figures

THICKNESS MEASURING DEVICE HAVING A SEGMENTED ROLLER AND HIGH GAIN AMPLIFIER

The present invention relates to a method of determining the resistance of transversely spaced longitudinal zones of a strip of electrically conductive material forming a web or a coating thereon. More particularly, the invention aims at providing a method for determining the thickness in the transverse direction of a wet layer coated onto a moving web.

From the published Dutch Pat. Application 6706577, corresponding to U.S. Pat. No. 3,535,631 issued Oct. 20, 1970, a method is known for determining the electrical resistance of a strip of electrically conductive material, comprising the steps of passing an AC current through such strip by coupling both ends of said strip to a source of AC current, the said coupling occurring at least at one end capacitively, and determining the said resistance from an electrical value or values obtained in the electric circuit. According to a particular embodiment of said method, a web carrying a wet layer coated thereon is conveyed over two electrically conductive rollers, one of which is composed of roller sections which are located axially beside each other, and which are mutually electrically insulated and each connected over an equal impedance to a common grounded connection. The measuring of the resistance of the different longitudinal zones of a strip of the web, corresponding with the roller sections, is done in measuring the voltages which develop over the respective impedances. The width of the roller sections, the distance between the two rollers and the specific resistance of the coating composition being known, the thickness of the coated layer in the transverse direction may be calculated, and a thickness profile may be plotted.

The described method of determining the thickness profile is inaccurate.

The currents which flow in the longitudinal zones may differ from each other as a consequence of unequal resistances of said zones which result from a non-uniform thickness of the coated layer in the transverse direction of the web. The impedances over which the roller sections are connected to the common point being equal to each other, the unequal currents flowing therethrough cause unequal tensions at the roller sections. Thereby the equipotential plane at the roller composed of said sections is destroyed, and as a consequence thereof currents will flow laterally between adjacent web zones. Thus, the current flowing through the impedance of a roller section is not exactly representative for the resistance of the corresponding zone of the material.

The object of the present invention is to prevent such lateral current flows, thereby to permit accurate measurements to be carried out.

The invention consists in a method of determining the resistance of transversely spaced longitudinal zones of a strip of electrically conductive material forming a web or a coating thereon, which comprises passing an AC current through said strip by coupling both ends thereof to a source of AC voltage, the said coupling occurring at one end by means of a first electrode extending transversely of the strip and at the other end by means of a plurality of second electrodes forming capacitors with adjacent strip portions, said second electrodes being located close to each other in the transverse direction of the strip, connecting the second electrodes to a common point in the circuit of the source of AC voltage and measuring the currents flowing from said second electrodes to said common point, while keeping the potential difference between said second electrodes and said common point substantially equal to zero, and determining from said measured currents and the AC voltage the resistances of the longitudinal zones of the strip corresponding with said second electrodes.

By the term "potential difference substantially equal to zero" is intended to mean that the potential difference is so low that the equipotential plane, as described hereinbefore, is not destroyed, and can be considered as a virtual zero point.

As the present invention is particularly developed in connection with the measuring of the thickness in the coating of liquid compositions such as pigmented layers, subbing layers, antistress layers, light-sensitive or, in general, radiation-sensitive layers, in the manufacture of materials for use in photographic processes, reference is particularly made to such materials in this specification but it is to be understood that the invention has many other potential uses.

For the same reason of development, the description deals particularly with the application of a liquid composition to a web, but it is clear that the invention is also suited for use in the embodiment wherein the liquid composition is a composition for forming a self-supporting sheet or web.

In the case of coating a liquid composition onto a web, it is evident that the conductivity of the web, or the layer or the layers on the web, to which a coating is applied, shall be substantially lower than that of the coated composition, since said web or said layers thereon constitute a resistance which is in parallel with the freshly coated layer to be measured.

While the present invention permits to ascertain the absolute thickness of a strip in the transverse direction by calculation from its electric resistance and from the specific resistance of the material of which it is composed, the electric resistance being itself calculated from the current flowing through the zones of the strip and the voltage drop developing over it, the invention also includes mere comparison of the readings resulting from testing a plurality of transversely spaced longitudinal zones e.g. in the case of a layer just coated on a web, in order to check the uniformity of the coating in the transverse direction, and to occasionally control the coating device in order to obtain a uniform coating.

The invention will now be described with reference to the accompanying drawings in which.

Figure 1:
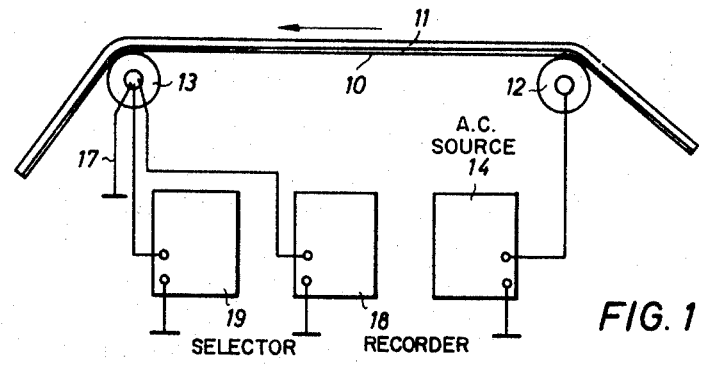
FIG. 1 is a diagrammatic lateral view of an arrangement for carrying out the method according to the invention.
Figure 2:
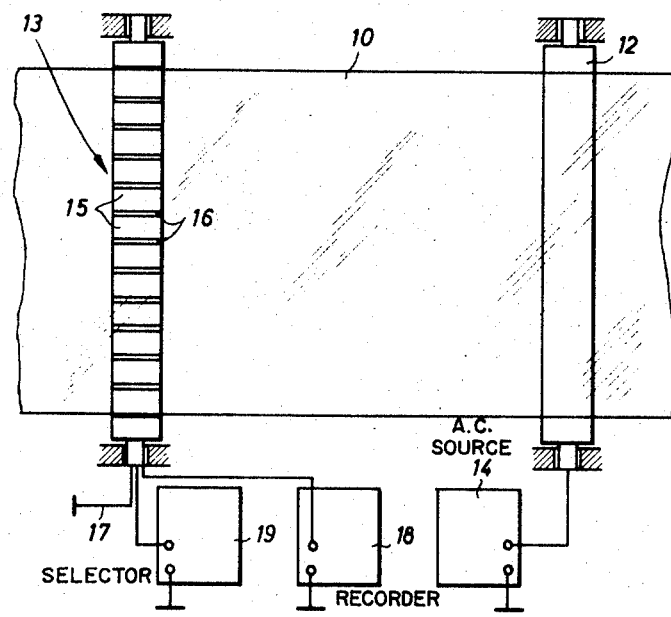
FIG. 2 is a plan view of the same arrangement, the web with the coated layer being shown as a transparent.

In the arrangement according to FIGS. 1 and 2, an insulating web 10, e.g. a film of polyethylene terephthalate, to which a conductive coating layer 11 has just been applied from a coating composition, is conveyed in the direction of the arrow over the supporting rollers 12 and 13 which both are rotatably journalled in an electrically insulating way and extend transversely of the web path.

The roller 12 is a one piece metal roller which is electrically connected to one terminal of a source 14 of AC voltage. The other terminal of said source is electrically grounded. The roller 13 is hollow and comprises fourteen electrically conductive cylindrical sections 15 which are electrically insulated from each other by thin insulating rings 16. The two extreme sections do not contact the web, and for the purposes of the electric measurement they may be left out of account. At the inner side each section 15 is provided with a connection through which it is connected to a common lead 17 which is electrically grounded.

At the interior of roller 13 switch means are provided which may connect a recorder 18 successively to the connections of the different roller sections 15 to the common lead 17, in order to record the currents flowing from said different sections 15 to the ground. The mentioned switch means are controlled by a selector 19 which permits to select the zone of the coated layer which will be measured.

In order to facilitate the understanding and to simplify the description of the working of the arrangement shown, first the principle of the measurement will be briefly described.

Figure 3:
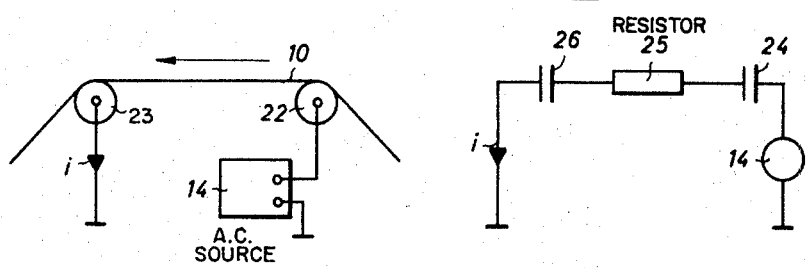
FIG. 3 illustrates the principle of the electric measurement.

In the illustration of FIG. 3, a web 10 is conveyed over two metal rollers 22 and 23 which extend transversely of the web path. A source 14 of AC voltage is connected to the roller 22. The other output terminal of the source 14 as well as the roller 23 are electrically grounded.

Figure 4:
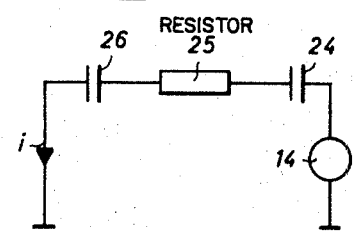
FIG. 4 is the equivalent electric circuit of the arrangement according to FIG. 3.

The simplified equivalent electric circuit of the arrangement according to FIG. 3 is shown in FIG. 4. It comprises the source 14 of AC voltage, the capacitor 24, the resistor 25 and the capacitor 26. The capacitor 24 represents the capacity between the roller 22 and the corresponding portion of the conductive layer on the web 10, whereas the resistor 25 represents the resistance R of the portion of the conductive layer extending between the two rollers and the capacitor 26 represents the capacity between the roller 23 and the corresponding portion of the conductive layer. When the capacities 24 and 26 and the frequency of the AC voltage of the source 14 are sufficiently great, the impedance of the capacitors in the circuit may be neglected regarding the resistance of the layer. Sufficiently great capacities may be obtained by passing the web 10 around a substantial angular portion of the rollers 22, 23, say over at least 35 angular degrees.

The current i flowing through the circuit may be written as:

$$i = E/R; \qquad (1)$$

$E$ being the AC voltage of the source 14, and
$R$ being the resistance of the concerned portion of the conductive layer.

In case the specific conductivity of the coated layer is known, and the distance between the rollers and the width of the coated layer remain constant, the web thickness of the coated layer may be calculated as follows:

$$d = \frac{1 \cdot e}{b \cdot E} \cdot i \qquad (2)$$

$d$ being the thickness of the coated layer
$1$ being the distance between the rollers
$e$ being the specific resistance of the coating composition
$b$ being the width of the coated layer.

In practice, the current flowing through the layer (resistance R) will be somewhat smaller than the current $i$ delivered by the source 14 because, amongst others, stray capacities exist between the coated web portion and parts of the coating apparatus through which currents flow through the ground, and a stray capacity exists which is in parallel with the resistance R.

However, in a given coating installation all said factors influencing the measurement are constants or almost so, hence their influence onto the measurement may be taken into account.

Figure 5:
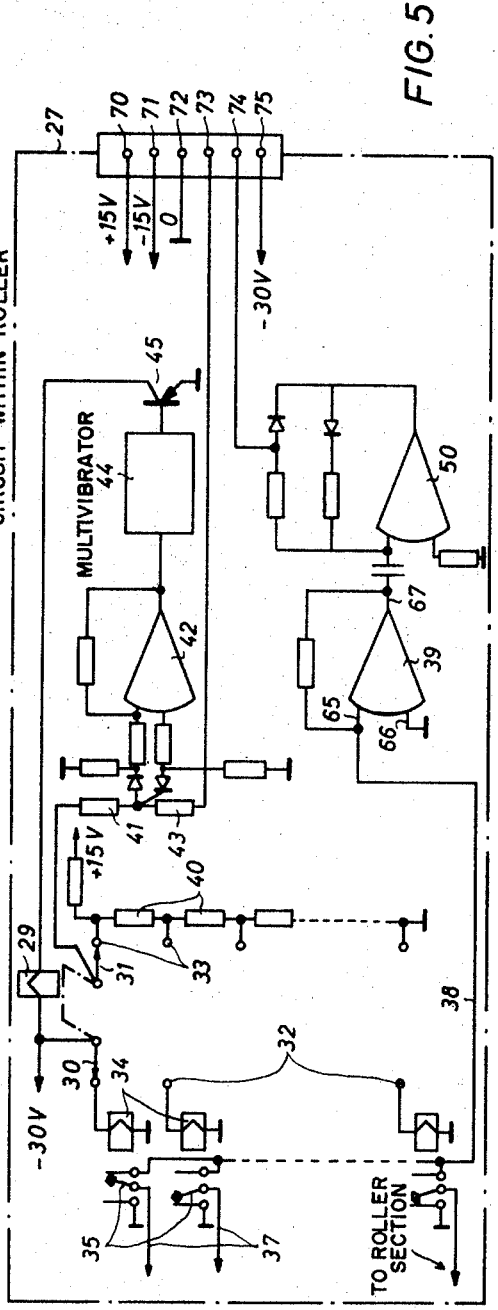
FIG. 5 is the electric circuit of the arrangement according to FIGS. 1 and 2.
Figure 5:
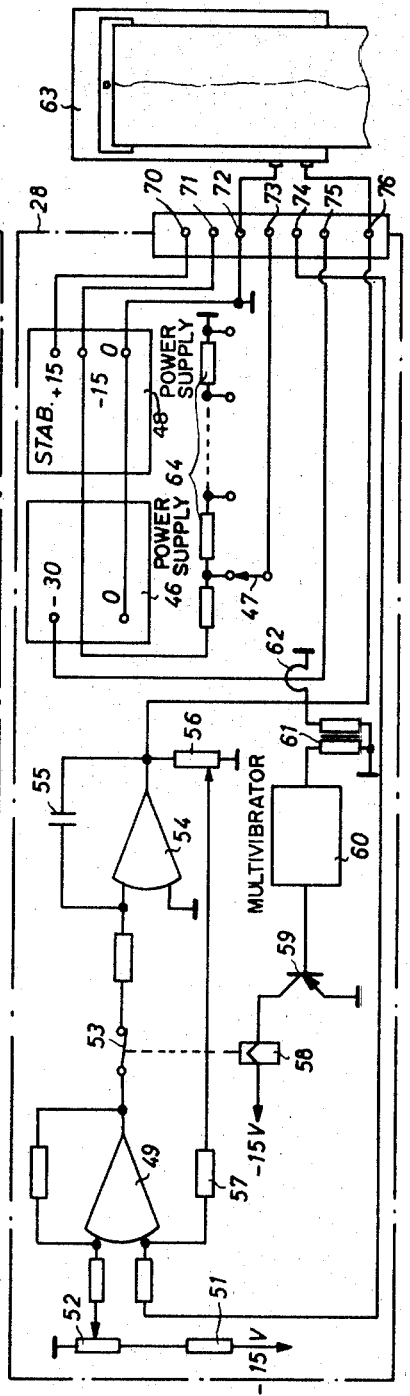

Said factors are not essential for the understanding of the method according to the present invention, and therefore the electric equivalents of said factors are not incorporated in the electric circuit of the arrangement which is shown in FIG. 5 and which will be described now.

The first part of the circuit of FIG. 5 which is comprised between the rectangle 27 shown in dash and dot lines, is located within the roller 13, and is connected over rotatable contacts with connections 70, 71, 72, 73 and 75, with the corresponding connections of the second part of the circuit which is comprised between there rectangle 28 and which may be located in a control desk for controlling the device.

A rotatable step switch which is actuated by a solenoid 29 has two rotatable contact fingers 30 and 31 which may successively contact two sets of contacts 32 and 33, respectively. Each set of contacts comprises 12 contact points, only few of them have been shown. The contact points of each set are angularly spaced over 30° so that after having effected 12 steps, the contact fingers 30 and 31 take again their initial position.

The contact points 32 are connected to relays 34 having change-over contacts 35. In the inoperative position of the relays the contacts 35 connect the sections 15 of the roller 13, to which they are connected through the leads 37, to the ground, whereas in the operative position of a relay the concerned section 15 of the roller 13 is connected through the lead 38 to the input of the operational amplifier 39 with resistive feedback.

The amplified AC signal is rectified in the AC to DC converter 50 and the output DC signal is connected to terminal 74.

The contact points 33 are connected to resistors 40 of equal value, which constitutes a voltage divider for a DC voltage of 12 volts. The voltage appearing on the slider 31 is applied over a resistor 41 to the input of an operational amplifier 42 with resistive feedback.

Over a resistor 43 a second voltage of opposite polarity is applied to the input of the amplifier 42 so that in fact only the difference between both voltages versus the ground is amplified. The circuit comprising two diodes in inversed connection passes only signals to the input of the amplifier. The magnitude of which is at least 1 Volt, i.e. the potential difference between two successive contact points 33 of the rotatable step switch.

A multivibrator 44 is controlled by the output signal of the amplifier 42 and is started to run when the input signal of the amplifier 42 becomes greater than the defined minimum value of about 1 volt. The output impulses of the multivibrator control a power transistor 45. The solenoid 29 is connected in the collector circuit of the transistor 45 so that the step switch, which is actuated by said solenoid 29, will turn over 30° for each impulse of the multivibrator 44.

The second part of the circuit located within the rectangle 28 comprises essentially the following components.

A power supply 46 providing a DC tension of −30 Volts in respect of the ground for feeding the solenoid 29 of the step switch.

A stabilized power supply 48 for providing DC voltages of −15 and +15 volts in respect of the ground for feeding the different operational amplifier circuits, and the voltage divider resistors 64 of zone selector 47.

An operational amplifier 49, with resistive feedback, one input terminal of which is connected to a voltage divider formed by the resistor 51 and the potentiometer 52. The potentiometer 52 is a 10-turn helicoidal-type potentiometer the function of which will be explained further in the description. The other input terminal is connected over terminal 74 to the output of the converter 50.

The output of the amplifier 49 is connected over a normally closed contact 53 to an operational amplifier 54 with capacitive feedback over a capacitor 55. Feedback over a potentiometer 56 and a resistor 57 permits to set the sensitivity of the measuring arrangement.

The contact 53 is controlled by a relay 58 which is connected in the collector circuit of transistor 59. The transistor is controlled by a monostable multivibrator 60, which may be triggered by the voltage impulse from a current-transformer 61 which transforms the impulse produced in the secondary of a transformer 62. Said transformer 62 is a current transformer with a ring-core through which the primary is axially passed and around which the secondary is toroidally wound.

A conventional continuously running recorder 63 is used for plotting the transverse thickness profile of the measured coating. The input of the recorder is connected to the terminals 72 and 76 of the device.

The operation of the device is as follows.

The operator sets the zone selector 47 into one of the 12 positions corresponding with the transverse zone of the coated layer on the web to be measured.

The negative DC potential corresponding with the particular setting of selector 47 is in opposition with the positive potential at the slider 31 of the voltage divider comprising resistors 40. In case the difference, either negative or positive, between both voltages is 1 volt or greater, 1 volt being the potential difference for each step of the voltage dividers 40 or 64, the multivibrator 44 is started to run. The solenoid 29 turns at each impulse of the multivibrator the rotatable step switch over 30° until the voltage obtained at slider 31 equals in magnitude the voltage set at the selector 47. At that moment the input voltage of the amplifier 42 becomes zero or almost so and the multivibrator is stopped.

A relay 34 corresponding with the selected zone is energized and through the change-over contact 35 the connection 37 of the corresponding roller section is connected to the lead 38.

By the energizing of a relay 34 the galvanic grounding of the corresponding roller section is broken. However, the electrical grounding remains intact as a consequence of the behavior of the high gain operational amplifier 39 with negative feedback loop. In fact, if a small voltage, measured at input 65 with respect to input 66, is assumed to exist; the amplifier output voltage at 67 will be of opposite polarity and can always increase in value (with infinite output available) until the voltage between inputs 65 and 66 becomes infinitesimally small. With the output fed back to input 65, the output voltage will always take the value required to drive the signal between inputs 65 and 66 towards zero.

The AC output of the amplifier is rectified by the half-wave operational rectifier circuit of converter 50 so that at the output terminal 74 of roller 13 a DC signal is obtained which can be easily transmitted to the stationary part of the device. Said DC signal is representative for the relative coating thickness of the coated layer.

The mentioned DC signal is amplified in the amplifier 49 and passed through the circuit of amplifier 54 to the output terminal 76. On the recording chart of the recorder 63 which is connected to output terminals 72-76 of the device, a curve is drawn as a function of the time, which represents the relative thickness of the measured zone or strip of the coated layer.

When the operator intends to measure another zone of the coated layer, he switches the selector 47 to the position corresponding with said zone. As a consequence thereof, the input voltage of the amplifier 42 becomes greater than the minimum for which the multivibrator remains inoperative, so that the latter now starts to run and makes the rotatable step switch turn to the right position.

The current impulses which flow through the lead from the −20 volts supply for each step of said switch, serve for triggering through transformers 62 and 61, the monostable multivibrator 60. When the multivibrator is triggered it flips over during a time which is slightly greater than the time required for the rotatable step switch to effect one step, and the relay 58 is excited during said period.

The object thereof is explained hereinafter.

When the rotatable step switch steps from one contact point 30 to the other, the current flowing through lead 38 becomes briefly zero, and the pointer of the recorder 63 tends to follow said zero impulse. In order to avoid the recording of said transition signal, which yet cannot occur faithfully, the contact 53 is opened. During the time the said contact is opened the amplifier 54 with capacitive feedback by capacitor 55 functions as a store circuit and the recorder continues recording the value of the current at the moment the contact 53 was opened. When the contact is closed again, the recording of the momentary current values continues.

During the recording it is desired, in general, to record the nominal coating thickness at about the center of the recording paper. An adjustment of the device in this respect occurs by means of the potentiometer 52 through which a determined DC potential may be applied to one of the input pins of the amplifier 49. In this way, the measuring signal from the measuring roller 13 becomes superposed on a signal of constant magnitude. For a given installation, and for a determined coating composition, the potentiometer 52 may be directly marked in values representing the coat weight, i.e. the quantum of applied coating composition per square meter. The deviations of the recording curve from the center directly represent the deviations of the effective coating thickness from the intended thickness.

The sensitivity of the recording, or the percentage of the deviation to the left or the right side of the scale, may be adjusted by means of potentiometer 56 which controls the feedback of the amplifier circuits 49, 54.

In the arrangement described hereinbefore, the following electrical values have been measured for a given light-sensitive silver halide emulsion layer coated on a substrated polyester support of a width of 1.20 m., and divided into 12 lateral zones.

| | |
|---|---|
| Frequency | : 100 kc. |
| Voltage at roller 12 | : 2.5 V. r.m.s. |
| Average current through lead 38 | : 50 μA |
| Output at terminal 74 | : 2 V. DC |

Accuracy, determined by comparing the measurement according to the method of the invention with the measurement of the layer thickness after drying : 5 percent.

In the device described so far, the operator must note, e.g. on the recording chart itself, which zone of the web is being measured, since the recorded curve provides no indication whatever on the zone to which it pertains.

The said difficulty may be avoided when an XY-recorder is connected to the device instead of the continuously running recorder 63, and when the selection of the distinct zones of the web is done as follows.

The selector 47 comprising the voltage dividing resistors 64 is replaced by a linear precision potentiometer, the slider of which is continuously and slowly rotated, e.g. by a small servomotor. Thus the tension obtained at terminal 73 has a sawtooth profile, rising linearly from zero to −12 volts and dropping quickly to zero as the slider of the potentiometer has made one revolution. The X-axis input of the recorder is connected to terminals 72 and 73, and the sensitivity of the recorder is adjusted so that the end of the X-axis scale is reached for the maximum voltage output, i.e. −12 volts.

The sensitivity of the amplifier 42 is adjusted in such a way that a voltage difference of 1 volt precisely is required at the connection of resistors 41 and 43 before the amplifier output starts to run the multivibrator 44. The Y-axis input of the recorder being connected to terminals 72 and 76, the recording operation occurs as follows.

The slider of the precision potentiometer starting from zero, the first zone of the web is connected in the measuring circuit and the recorder continuously records the relative layer thickness of said zone. When the pointer of the recorder has travelled one-twelfth of the X-axis, the tension at terminal 73 has reached 1 volt so that the multivibrator 44 is started and makes the rotatable switch effect one step. The second zone of the web is being measured now while the pointer of the recorder continues to uniformly advance in a direction parallel to the X-axis. The other zones of the web are measured in a similar way. After the 12th zone has been measured, the precision potentiometer has made one revolution so that its output voltage suddenly drops from −12 volts to zero. At this stage the measuring operation is stopped, and a new recording chart is laid on the recorder, either manually or automatically, because the recorder now will start to write a second curve over the first recorded one.

It is clear that the method according to the present invention is not limited to the embodiments described hereinbefore.

The output signals of the measuring device need not necessarily be recorded as described, but they may also control a warning device or the like in case the effective coating thickness should differ from the intended thickness by a value greater than a pre-set minimum deviation.

Alternatively, the output signals for the different zones may be used for controlling, either manually or automatically, provisions in he coating installation that may control the quantum of applied coating composition according to the transverse direction of the web.

In case the absolute thickness of a freshly coated layer should be measured it is necessary, as described already hereinbefore, to know the specific resistance of the applied coating composition. An arrangement for measuring such specific resistance and for using it in the determination of the absolute layer thickness, is described hereinafter.

Figure 6:
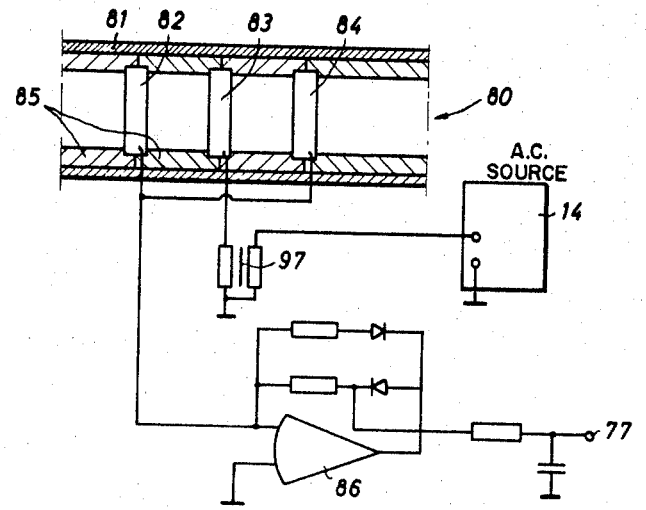
FIG. 6 is an arrangement for determining the specific conductivity of the coating composition.

A conduct section 80 as shown in FIG. 6 is provided in the coating installation for measuring the specific conductivity of the coating composition as it is fed to the coating tray. The conduct section comprises a stainless steel tube 81, provided with three conductive stainless steel rings 82, 83 and 84, which are supported electrically insulated from each other by means of rings 85 of Teflon (registered trade mark) or like material. The central ring 83 is connected to an appropriate generator of AC voltage. Since the frequency of the AC voltage is but little critical for the present circuit, the AC voltage may be simply branched off from the generator 14 which is already connected to the roller 12, and coupled to the ring 83 over a transformer 97. The rings 82 and 84 are connected to the operational amplifier 86 which is connected as AC to DC converter. Since the potential difference between the input terminals of the amplifier equals almost zero, the circuit actually measures the current flowing through the coating composition in the conduct section. Said current is a measure for the specific conductivity of the coating composition.

Figure 7:
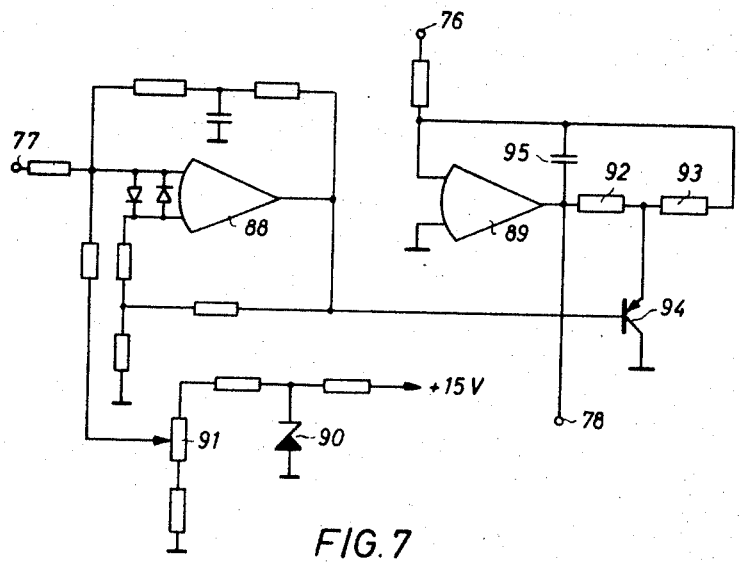
FIG. 7 is the electric circuit for determining the absolute layer thickness.

The DC output of the amplifier which is preferably mounted close to the conduct section 80, is connected over terminal 77 to the electronic divider circuit shown in FIG. 7, wherein the measuring signal applied to input 76, and which represents the relative coating thickness of the layer, is divided by the signal which is representative for the specific conductivity of the coating, so that an output signal is obtained at terminal 78 which directly represents the absolute thickness of the measured zone of the layer.

The circuit essentially comprises the operational amplifier 88 which is connected as a pulse-width modulator, and the operational amplifier 89 with variable resistive feed back. The output signal of the amplifier-converter 86 is connected to input terminal 77 of the modulator 88, and controls the width of the pulses. In the actual circuit, an input signal of 2 to 10 volts at input 77 made the pulse width vary between 0.5 m.sec. and 2.5 m.sec., at a frequency of 250 Hz.

A DC voltage stabilized by a Zener diode 90 is applied to a potentiometer 91 and the voltage obtained at the slider thereof is used for biasing the input of the modulator in order to establish the initial working conditions.

The output signal which is obtained at terminal 76 of the measuring unit is connected to the input of amplifier 89. The resistive feedback of said amplifier which occurs over resistors 92 and 93 may be made ineffective by grounding the connection between both resistors. This is done by the switching transistor 94.

The circuit operates as follows.

Assuming the specific conductivity of the coating composition suddenly decreases by say a factor 2. The measuring unit as shown in FIG. 5 will accept the relative coating thickness as being reduced by a factor 2 (the effective coating thickness being unaltered), because the resistance of the measured zone has become twice as high. Thus the measuring signal at terminal 76 will be less by half the value which is representative for the actual coating thickness.

The reduced conductivity makes the DC output of the converter circuit 86 to be only half the initial value, and consequently the width of the pulses generated by the circuit of amplifier 88 will be reduced by a factor 2. The switching transistor 94 is closed thereby during a total time which is half as long only, and the feedback of amplifier 89 is reduced by half. As a result thereof, the gain of the circuit is doubled, and at the output terminal 78 the same signal is obtained as before. The pulsating DC signal at the output of amplifier 89 is smoothed by a capacitor 95. A recorder which may be connected between terminal 78 and the ground, now directly indicates the absolute thickness profile of the measured layer.

The arrangement for taking into account the conductivity of the coating material into the measurement of the relative thickness in order to obtain an absolute thickness value is not limited to the particular electronic circuitry shown, and other circuits for performing the same function fall within the scope of the present invention.

We claim:

1. In a device for detecting thickness variations in sheet material of the type having a conductive layer superimposed on an insulative layer including, an AC source, a roller electrode connected to said source and extending traversely across said sheet for contacting the insulative layer, roller electrode means having a plurality of axially interposed electrically conductive circumferential rings separated by electrical insulation extending transversely across said sheet for contacting the insulative layer at points spaced from said roller electrode, whereby the coupling of the thus disposed electrodes is a capacitive coupling, and signal measuring means for indicating the thickness of said sheet having one end connected to said source and another end adapted for connection to said discs, the improvement comprising a high gain amplifier having a pair of inputs and an output, and a negative feedback loop connected between said output and one amplifier input, the other amplifier input being connected to a source of reference potential, switch means connected to each of said rings for connecting each of said rings to a source of reference potential when in an inoperative position and to said one amplifier input when in an operative position, control means for selectively moving said switch means one at a time to said operative position to couple a strip of said sheet material in circuit, and means connecting the output of said amplifier to the other end of said signal measuring means, whereby the thickness of the sheet material along selected strips can be selectively indicated.

2. Device according to claim 1, wherein signal storage means is provided between the output of the said high gain amplifier with negative feedback loop and the means for measuring the output signal of the amplifier, to store the said output signal during the time required for the control means to connect another individual electrode to the input of said high gain amplifier.

3. Device according to claim 2, wherein said signal storage means comprises an amplifier with capacitive feedback.

4. Device according to claim 1 including an AC to DC convertor for rectifying the output signal of said high gain input amplifier and means for superimposing a predetermined DC potential on said rectified signal from said amplifier.

* * * * *